UNITED STATES PATENT OFFICE.

FRANCIS ROY SULLIVAN, OF SHELBURNE FALLS, MASSACHUSETTS.

WRITING FLUID.

1,228,259.

Specification of Letters Patent.

Patented May 29, 1917.

No Drawing.

Application filed September 18, 1916. Serial No. 120,881.

*To all whom it may concern:*

Be it known that I, FRANCIS ROY SULLIVAN, a citizen of the United States, residing at Shelburne Falls, in the county of Franklin and State of Massachusetts, have invented certain new and useful Improvements in Writing Fluids; and I do declare the following to be a full, clear, and exact description of the invention, such as will enable others skilled in the art to which it appertains to make and use the same.

This invention relates to a writing fluid for use on polished or plated metal, glass and other smooth surfaces.

The object of the invention is to produce a fluid of this character which will adhere to a smooth metal, glass or similar surface, and which may be used in connection with a pen, and will dry almost instantly after its application.

This writing fluid consists of a mixture of transparent gloss varnish, a suspension of precipitated white chalk in turpentine, and oil of sassafras.

In preparing the fluid I prefer to use the ingredients in the following proportions, to wit:

50% of transparent gloss varnish.

47% of a suspension of chalk in turpentine.

3% oil of sassafras.

In forming the fluid, the turpentine and chalk are mixed one-half and one-half, the transparent gloss varnish is then mixed with the suspended chalk in turpentine, and finally the oil of sassafras added.

To make one quart of the fluid, one pint of the transparent gloss varnish is used with one ounce of oil of sassafras, the turpentine mixed with precipitated white chalk being employed in sufficient quantity to complete the quart. Approximately one ounce of chalk is mixed with the turpentine, but the quantity may be varied. When it is desired to make a white writing fluid, no coloring matter is added to the ingredients, but when it is desired to color the fluid, any heavy gloss printing ink may be used, the quantity varying according to the color desired.

The chalk settles to the bottom, and the fluid must be shaken well before using. This writing fluid may be applied in any suitable or desired manner, a steel pen being preferably used. The fluid dries almost instantly after its application, and adheres firmly to any smooth surface on which it is used.

I claim:

1. A writing fluid of the class described comprising transparent gloss varnish, a suspension of precipitated white chalk in turpentine, and oil of sassafras.

2. A writing fluid of the class described composed of fifty per cent. of transparent gloss varnish, forty-seven per cent. of a suspension of precipitated white chalk in turpentine, and three per cent. of oil of sassafras.

In testimony whereof I have hereunto set my hand in the presence of two subscribing witnesses.

FRANCIS ROY SULLIVAN.

Witnesses:
ROLAND S. HARDY,
CHILTON L. McKNIGHT.